United States Patent
Malikayil

[11] Patent Number: 5,993,494
[45] Date of Patent: Nov. 30, 1999

[54] METHOD OF MANUFACTURING MODULAR COMPONENTS FOR A BIPOLAR BATTERY AND THE RESULTING BIPOLAR BATTERY

[75] Inventor: Lookose Malikayil, Coon Rapids, Minn.

[73] Assignee: GNB Technologies, Inc., Mendota Heights, Minn.

[21] Appl. No.: 08/900,681

[22] Filed: Jul. 25, 1997

[51] Int. Cl.⁶ .................................................. H01M 10/18
[52] U.S. Cl. ........................ 29/623.5; 429/210; 429/225; 429/234; 429/241
[58] Field of Search .................................. 429/210, 233, 429/234, 241, 246, 225, 228; 29/2, 623.5

[56] References Cited

U.S. PATENT DOCUMENTS

| | | | |
|---|---|---|---|
| 2,416,576 | 2/1947 | Franz et al. | 136/111 |
| 2,496,709 | 2/1950 | Gelardin | 136/111 |
| 2,966,538 | 12/1960 | Bernot | 136/111 |
| 3,728,158 | 4/1973 | Poe et al. | 136/10 |
| 3,775,189 | 11/1973 | Jaggard | 136/75 |
| 3,813,300 | 5/1974 | Shima et al. | 136/38 |
| 3,901,731 | 8/1975 | Warszawski et al. | 136/86 R |
| 3,941,615 | 3/1976 | McDowall | 136/38 |
| 4,125,680 | 11/1978 | Shropshire et al. | 429/4 |
| 4,223,081 | 9/1980 | Faber | 429/234 |
| 4,275,130 | 6/1981 | Rippel et al. | 429/144 |
| 4,331,747 | 5/1982 | Julian et al. | 429/160 |
| 4,353,969 | 10/1982 | Rippel et al. | 429/144 |
| 4,734,977 | 4/1988 | Blomberg et al. | 29/623.5 |
| 4,900,643 | 2/1990 | Eskra et al. | 429/241 |
| 4,964,878 | 10/1990 | Morris | 29/623.1 |
| 5,068,160 | 11/1991 | Clough et al. | 429/72 |
| 5,139,902 | 8/1992 | Drews et al. | 429/234 |
| 5,225,292 | 7/1993 | Korinek et al. | 429/82 |
| 5,232,797 | 8/1993 | Moulton et al. | 429/210 |
| 5,326,656 | 7/1994 | Meadows et al. | 429/178 |
| 5,429,643 | 7/1995 | Lund et al. | 29/623.3 |
| 5,498,496 | 3/1996 | Sasaki et al. | 429/233 |
| 5,508,131 | 4/1996 | Bowen et al. | 429/210 |
| 5,688,615 | 11/1997 | Mrotek et al. | 429/210 |
| 5,800,946 | 9/1998 | Grosvenor et al. | 429/210 |

FOREIGN PATENT DOCUMENTS 59-75579   4/1984   Japan.

*Primary Examiner*—Stephen Kalafut
*Assistant Examiner*—Jennifer O'Malley
*Attorney, Agent, or Firm*—Leydig, Voit & Mayer, Ltd.

[57] ABSTRACT

A bipolar cell, such as a lead-acid cell, comprising bipolar plates having a conductive metal substrate with a pre-cured active material grid comprising a mesh and positive active material in contact on one side of the conductive substrate and a negative active material grid unadhered to the conductive substrate and positioned in contact on the opposite side from the positive active material grid.

8 Claims, 2 Drawing Sheets

METHOD OF MANUFACTURING MODULAR COMPONENTS FOR A BIPOLAR BATTERY AND THE RESULTING BIPOLAR BATTERY

FIELD OF THE INVENTION

This invention relates to batteries such as, for example, bipolar batteries utilizing modular components, and, more particularly to a novel method for incorporating the appropriate active material.

DESCRIPTION OF THE PRIOR ART

Lead-acid batteries and cells have been known for a substantially long period of time and have been employed commercially in a relatively wide variety of applications. Such applications have ranged from starting, lighting and ignition for automobiles, trucks and other vehicles (often termed "SLI batteries") to marine and golf cart applications and to various stationary and motive power source applications (sometimes termed "industrial battery" applications).

The lead-acid electrochemical system has provided a reliable energy source which is capable of being manufactured in automated production while providing acceptable quality. However, one serious drawback of either the flooded or sealed, absorbed electrolyte, lead-acid batteries is the relatively low energy and power density (i.e., kilowatts/unit weight and watt-hours/unit weight, respectively) provided by such systems. It has long been a desire to provide an energy source with the reliability of a flooded or sealed lead-acid battery system while at the same time achieving much greater energy and power densities.

For this reason, considerable effort over at least the last 20 years has been directed to using lead-acid and other electrochemical systems in a bipolar design. In such a design, by definition, the positive and negative plates in some fashion share the same conductive grid or substrate. Some of the patents relating to bipolar batteries or to components and the like for such batteries include the following U.S. Pat. No. 2,416,576 to Franz et al; U.S. Pat. No. 2,496,709 to Jelardin; U.S. Pat. No. 2,966,538 to Bernot; U.S. Pat. No. 3,728,158 to Poe et al.; U.S. Pat. No. 3,775,189 to Jaggard; U.S. Pat. No. 3,910,731 to Warszawski et al.; U.S. Pat. No. 3,941,615 to McDowall; U.S. Pat. No. 4,125,680 to Shropshire et al.; U.S. Pat. No. 4,964,878 to Morris; and U.S. Pat. No. 5,068,160 to Clough et al.

Some of these patents utilize metallic substrates which are molded into a plastic frame of varying configurations. However, there are a variety of technical problems that need to be addressed and solved when utilizing this approach.

Copending application Ser. No. 08/586,955, filed Jan. 16, 1996, to Lund et al., now U.S. Pat. No. 5,658,690 issued Aug. 19, 1997 and assigned to the assignee of the present invention, addresses certain of these problems. More particularly, Lund et al. discloses a modular plastic frame for a bipolar battery which, among other attributes, facilitates providing electrolyte acid fill/vent holes.

Still another problem has been to provide a bipolar battery design that could be assembled in an automated, reliable fashion, while achieving a well-functioning battery in a cost-effective manner. U.S. Pat. No. 5,429,643 to Lund et al., also assigned to the assignee of the present invention, does provide a method for assembling a bipolar lead-acid battery which is amenable to automated production at commercially acceptable production rates, utilizing modular bipolar battery components which include a series of molded plastic frames with metallic inserts.

Yet another problem has been to insure that the active material remains in contact with the metallic substrate throughout the life of the battery. This has proven quite difficult due to the nature of the active material paste and the surface of the thin metallic substrate.

U.S. Pat. No. 5,326,656 to Meadows et al. addresses, in addition to other problems, this issue. Meadows et al. does disclose a bipolar electrode comprising a lead plate septum having an adherent, porous coating on at least one face (preferably both faces) thereof for securely anchoring the active material thereto. The coating comprises multiple layers of arc-sprayed, lead particles fused to each other, and to the face of the septum, providing a plurality of interconnecting, interstitial pores for anchoring the leady active material to the septum. The bipolar electrodes are mounted in non-conductive frames and have non-conductive lattices overlaying the faces thereof and stacked together with spacer frames and monopolar electrodes (i.e. at the ends of the stack) to form a complete bipolar battery, the several frames resting within each other.

These non-conductive lattices are integral with the frame, and inboard the periphery thereof, overlaying the faces of the septum so as to provide a plurality of pockets extending across the septum faces for receiving and retaining the active material for the battery. These lattices are mesh-like in character in that they stand in relief above the opposing faces of the frame and define a shoulder with the frame, which shoulder circumscribes the lattice. After the pockets are filled with appropriate active material, the several framed electrodes are stacked together, face-to-face, with opposite polarity active material on a adjacent electrodes opposing one another across an electrolyte retention region therebetween.

In addition to the additional processing and assembling steps required, Meadows et al. does not address processing aspects which can be significant. More particularly, the electrical performance of bipolar batteries is dependent upon a variety of parameters, including the porosity, crystal size and crystal type of the active material, all of which are affected by the method of heat treating or curing the active material paste. It would accordingly be desirable to provide a bipolar battery design and assembly process in which the curing of the respective positive and negative active material pastes could be separately carried out, tailored to provide optimum cure for the respective active material. Such separate curing is not possible with the Meadows et al. bipolar battery in which the active material must be adhered to the coating on the lead plate septum disclosed prior to any curing taking place. Additionally, the mesh-like lattice of Meadows et al., being integral with the frame employed, does not allow conventional equipment used for pasting active material to be employed.

It is accordingly a principal object of the present invention to provide a bipolar battery having positive and negative active material which can be independently processed, including curing and post-curing treatments.

Another object of this invention provides a method for achieving a bipolar battery having a uniform active material thickness.

A further object of this invention lies in the provision of a facile method for applying the active material paste needed for a bipolar battery. A related and more specific object provides a method which can utilize conventional pasting equipment and/or is amenable to relatively high speed manufacturing.

These and other objects and advantages of the present invention will be apparent from the following description and drawings.

SUMMARY OF THE INVENTION

In accordance with the present invention, it has been found that desired electrical performance for a lead-acid battery can be achieved without having the active material adhered prior to formation to the conductive substrates. Accordingly, separate curing of the positive and active material paste can be carried out, each tailored to optimize the curing of the respective active material. To this end, the present invention utilizes a modular active material frame having pockets for holding the active material paste, which can be thereafter cured. It has thus been found that the use of the present invention can provide bipolar cells and batteries characterized by more consistent electrical performance than can be achieved when the active material paste is adhered to the conductive substrate prior to curing the active material.

DETAILED DESCRIPTION OF THE INVENTION

Figure 1:
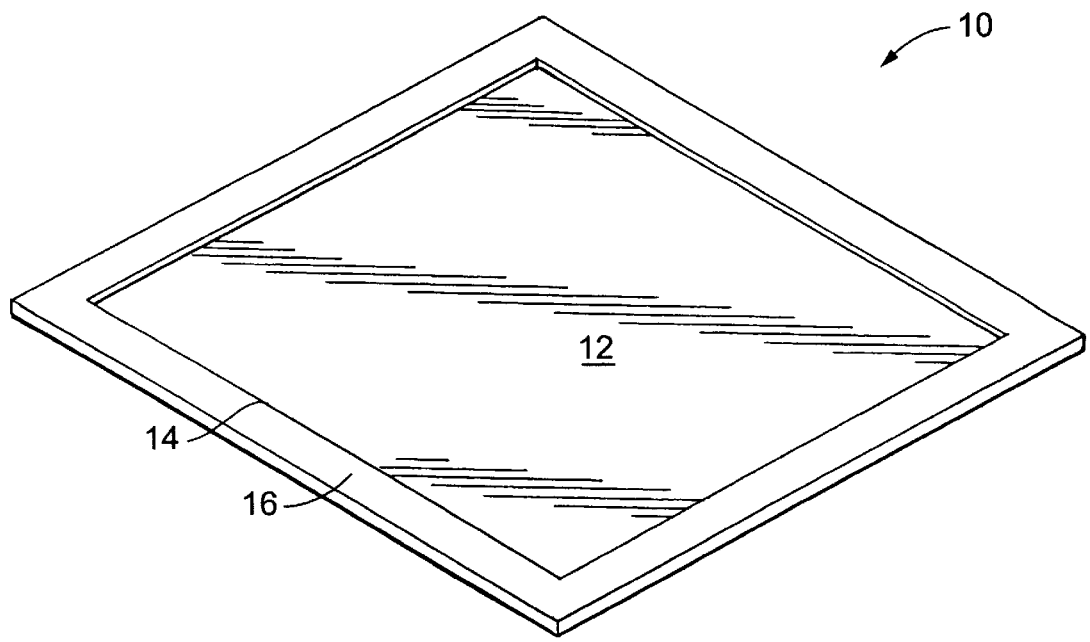
FIG. 1 is an isometric view of one embodiment of a modular plastic bipolar plate used in the present invention.

FIG. 1 shows one embodiment of a modular frame member 10 comprising a conductive substrate, here being a metallic substrate 12, with the periphery of the metallic substrate 12 embedded in a plastic frame 14 having a thickness indicated at 16. This modular frame 10 can be in any configuration desired.

The principal requirements for the modular frame member are the selection of a suitable plastic for the frame and the selection of the desired conductive substrate used for the bipolar plate itself. Many are known and can be used.

As illustrative examples, the thickness of the metallic substrate 12 will be about 0.012 inch or so, often having a thickness in the range of about 0.008–0.010 inch. The area of the metallic substrate 12, framed by the plastic frame 14, serves as the area for receiving the active material. The thickness of the active material is determined by the dimension between the surface of the metallic substrate 12 and the top surface of plastic frame 14.

When used as a bipolar plate, modular frame member 10 has positive active material on one surface and negative active material on the other surface. The end frames are pasted to provide a positive and a negative plate.

As far as materials of construction are concerned, any desired lead, lead alloy or other conductive substrate useful in electrochemistry may be employed. For example, illustrative useful alloy families are known and include lead-tin binary alloys, lead-calcium-tin ternary alloys and calcium-tin-silver-lead alloys.

With respect to the plastic frame material, as illustrative examples, it is suitable to use polypropylene or ethylene-propylene copolymers as are used in many other types of lead-acid batteries. Most other plastics may also be employed. If desired, filler materials may be used to provide stiffness and enhanced mechanical properties, such as, for example, the inclusion of glass beads up to a percentage, by the weight of the plastic frame, of 20%, or even more.

As may be appreciated, the metallic substrate 12 serves the same purpose as an intercell connector in a conventional lead-acid battery. The high ratio of the intercell connection area to the pasted area and the very short intercell current path give the bipolar battery design tremendous performance advantages in comparison to conventional lead-acid battery systems.

Pursuant to the present invention, it has been discovered that adhesion between the metallic substrate 12 and the active material paste is not required to provide satisfactory electrical performance. Indeed, it has been found that an active material grid having pockets for retaining the active material can be used.

Figure 2:
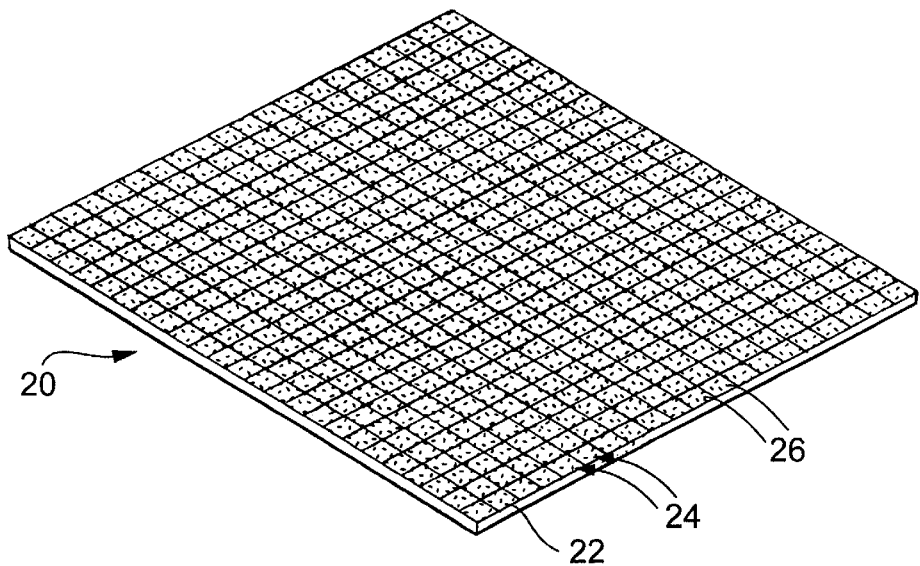
FIG. 2 is an isometric view of an active material modular frame used in the present invention.

Thus, as is shown in FIG. 2, an active material modular grid 20 comprises a plastic frame 22 about the periphery and divided into a series of pockets 24, each pocket retaining active material. The active material frame 20 thus defines the thickness of the respective active material layers by the thickness of the frame used for the positive and negative active materials. However, if desired, the plastic mesh or frame may be overpasted.

The configuration of the active material frame can be varied as desired. In general, as illustrative examples, the outer frame can have a thickness of from about 50 mils to about 250 mils, the thickness of the partitions defining the walls of the individual pockets can range from about 10 mils to about 80 mils, and the area of an individual pocket can vary from about 1 $mm^2$ to about 1 $cm^2$.

There is wide latitude in these dimensions. In general, what is required is that the active material modular grid have sufficient integrity to satisfactorily process during the pasting operation and the subsequent cell or battery assembly, while providing the desired cell performance characteristics. Thus, the degree of openness of the grid will affect the cell capacity since the solid grid area will reduce somewhat the amount of active material present. There is thus a trade-off. Accordingly, while the degree of openness can be varied as desired in view of the electrical performance requirements for the particular application, it will generally be desirable to have a void volume of at least about 50% of the active material grid, more preferably, at least about 80%.

As illustrative examples of useful materials for the active material modular grid, polypropylene and ethylenepropylene copolymer meshes are known and may be used. Other plastics and conductive and non-conductive materials can be employed as well.

Similarly, useful active material 26 can be varied as desired, depending upon the requirements of the particular application. As an illustrative example, for bipolar lead-acid batteries, the positive active material is made from a paste of lead oxide, sulfuric acid and water. One specific example comprises an oxide paste containing about 19.1% sulfate and 17.1% water, both by weight of the paste. Likewise, the thickness of the active material can vary, as is desired for the requirements of the application. In general, illustrative thicknesses can range from about 5 to about 250 mils.

As to illustrative negative active material for lead-acid cells and batteries, such negative active material pastes comprise lead oxide, sulfuric acid and water, as is known. A specific example includes about 13.6% sulfate and 13% water, both by weight of the paste. An illustrative useful range of thickness for the negative active material is from about 5 to about 250 mils.

The present invention allows versatility in processing, while at the same time, allowing tailoring of the curing conditions to the particular requirements considered optimum for the particular active material composition being employed. Even further, the use of the active material grids is amenable to automation and continuous, or semi-continuous, production.

Thus, given the typical thickness and the flexibility of useful plastic materials, a continuous plastic roll can be fed into a stamping die and stamped to provide the grid with active material pockets of the size desired. Then, the thus-formed active material grid can be pasted and then cut into the desired size and automatically stacked for curing. Thereafter, the thus-cured plates, cured under conditions optimized for the battery performance desired, can then be placed in the modular frames and the battery can be assembled.

Thus, in contrast to the approach wherein the active material for the positive is pasted on one side and negative active material is pasted on the opposite side of the substrate so as to be adhered thereto and the curing conditions inherently being limited in the process, the present invention allows curing conditions tailored to those conditions considered optimum for the particular active material composition involved. As an illustrative example of suitable conditions for lead-acid positive active material pastes, curing can be carried out at 100% humidity at 90° C. for two to three hours or so.

In contrast, the negative active material lead-acid pastes may not even be cured. However, illustrative curing conditions for such pastes, when used, may be at 40° C. and 50% humidity for up to 24 hours, or until the paste is dry to the touch.

As may be appreciated from the diverse conditions used to treat positive and negative lead-acid active material pastes, the present invention allows use of the conditions for the respective active material considered optimum. The size, shape and particular crystal structure of the lead sulfate can be thus optimized.

Not only does the present invention allow the ability to achieve a uniform active material layer thickness which is important to the electrical performance of a bipolar battery, the subject invention should allow the use of pasting equipment conventionally used with other types of lead-acid batteries. The economic advantages enjoyed are considerable.

Figure 3:
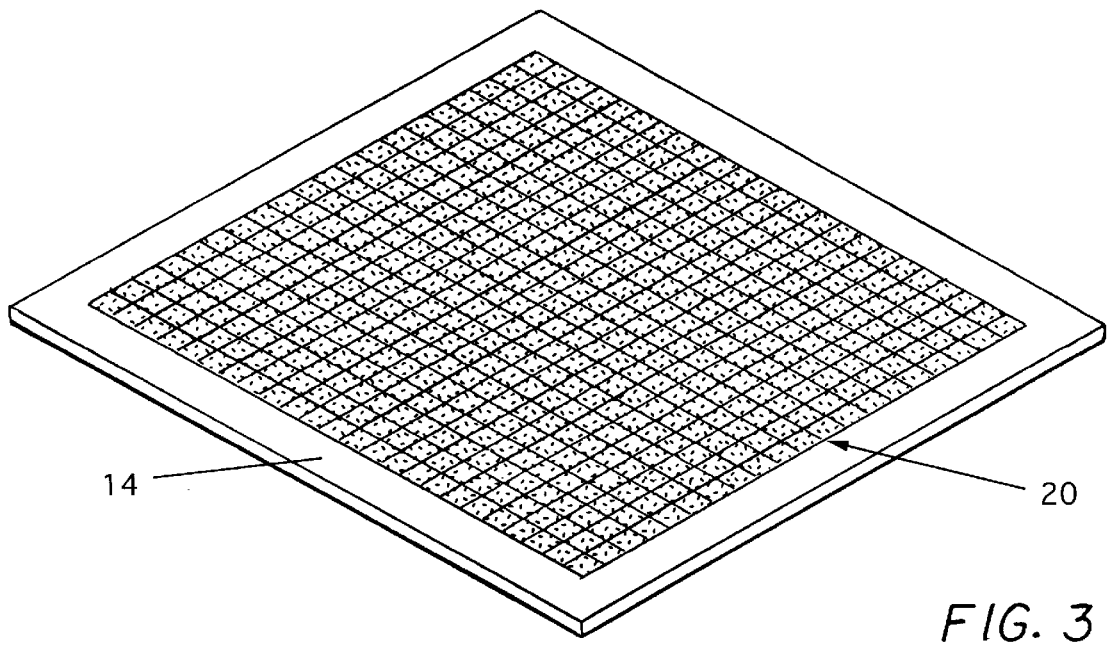
FIG. 3 is an isometric view end showing the active material frame of FIG. 2 in its assembled position in the bipolar frame shown in FIG. 1.

FIG. 3 shows the active material modular member 20 assembled into the modular plastic frame 10. As can be seen, the active material frame periphery nests into the area within frame 14, presenting a flush surface for assembly. Assembly can then be carried out by stacking the respective frames in the sequence desired and then assembled into the resulting battery.

Suitable assembly techniques for the bipolar battery are known. It is particularly preferred to use the assembly method shown in the aforementioned '643 Lund et al. patent.

As hereinbefore discussed, it has been found that adhesion between the plate and the active material is unnecessary. Highly desirable electrical performance is achieved simply by maintaining satisfactory contact between the plate and the cured, pasted active material grid.

In the case of a bipolar lead-acid cell utilizing a highly absorbent glass fiber separator (such as the type used in valve-regulated lead-acid cells), satisfactory contact is obtained by utilizing a separator thickness that, after assembly of the cell, is compressed by about 30% or so (based upon its uncompressed thickness). It should be expected that lesser compressions (e.g., 10 or 15% to 30%) will also be satisfactory, and a useful level can be determined by straightforward experimentation.

Figure 4:
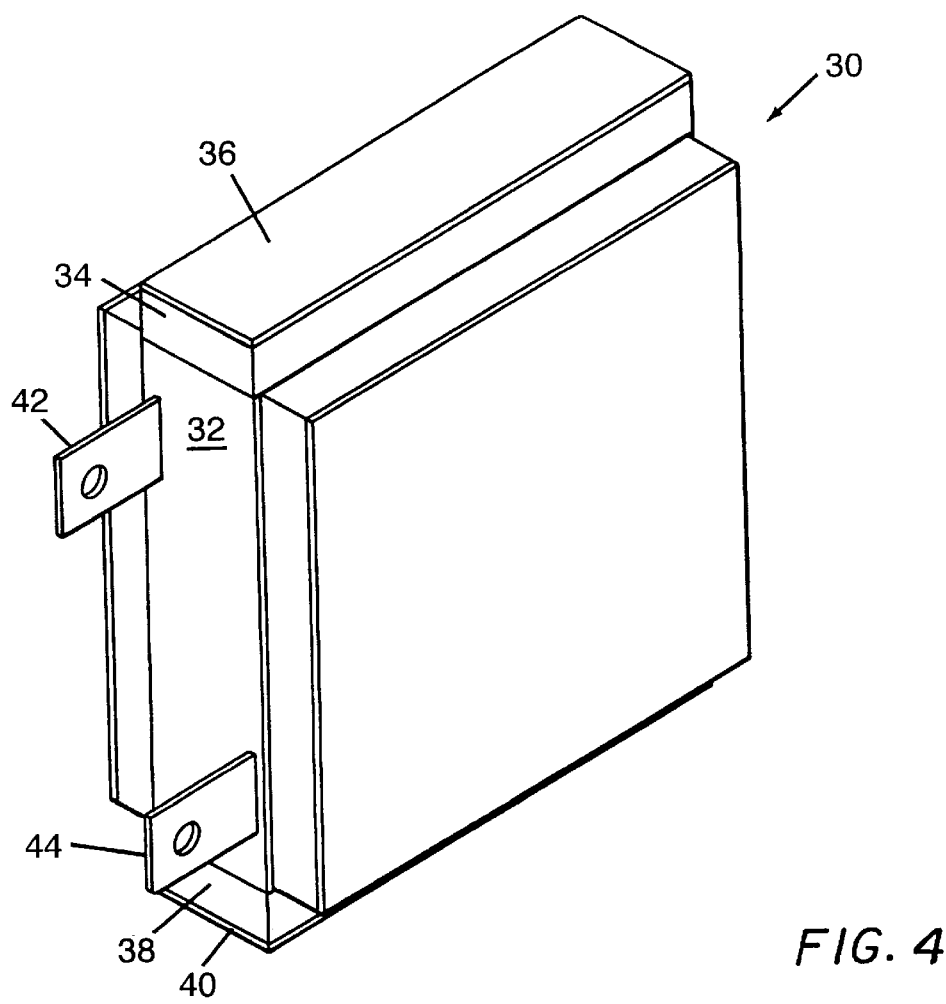
FIG. 4 is an isometric view of the bipolar battery according to the present invention.

FIG. 4 illustrates a suitable bipolar battery made using the molded modular components of the present invention. The bipolar battery 30 thus comprises side panels 32, fill/vent box 34, fill/vent box cover 36, vacuum box 38, vacuum box cover 40, positive terminals 42 and negative terminal 44 which may be electrically connected by using electrical jumpers/bus bars installed as necessary to provide the desired electrical connections desired.

As a specific example of a 4-Volt, bipolar lead-acid battery utilizing the pasted plastic grids as described herein, the following prototype parameters may be used:

| Positive Active Material | |
| --- | --- |
| Paste wet weight | 248 grams |
| A.M.A.D | 4.2 |
| Cube weight | 70.8 |
| Penetration of paste | 28 |
| Thickness of paste | 60 mil |
| Dry weight of paste | 215.8 grams |
| Negative Active Material | |
| Paste wet weight | 262 gram |
| A.M.A.D. | 4.34 |
| Cube weight | 74 |
| Penetration of paste | 23 |
| Thickness of paste | 60 mil |
| Dry weight of paste | 235.8 gram |
| Plastic Grid | |
| Grid area | 61.87 inch square |
| Mesh size | 250 mil |
| Web thickness | 30 mil |
| Weight grid | 16.5 grams |

The formation acid can be sulfuric acid electrolyte having 1.245 specific gravity. A glass fiber separator having a thickness of 210 mils may be used.

Thus, as has been seen, the present invention provides a bipolar battery that is assembled of modular components. These components are readily amenable to automation and commercial production. The advantages derived from use of the active material grids are considerable, as has been previously discussed.

Indeed, it appears that, for whatever reason, wicking into the active material may be enhanced somewhat, perhaps along the plastic-paste interface. Enhanced active material utilization may thus be possible. At any rate, what is evident is that use of the present invention provides lead-acid bipolar cells which achieve more consistent cell-to-cell electrical performance, over and above the other significant advantages.

While the present invention has been illustrated and described herein with respect to certain preferred embodiments, it should be appreciated that the present invention is not so limited. Thus, for example, while the present invention generally has been described in conjunction with sealed lead-acid cells and batteries and more particularly bipolar, sealed cells, it should be appreciated that the present invention is likewise fully applicable to a flooded bipolar lead-acid battery. Indeed, the present invention could be used with spiral cells, such as lead-acid, valve-regulated cells, utilizing thin lead foil or the like. The plastic grids would be pasted with either positive or negative active material and placed on both sides of the thin foil, which is then rolled with the separator to provide the spiral cell, as is known. Even further, the present invention may be used with cells other than lead-acid cells. As used in the following claims, the reference to bipolar plate is intended to include the thin foil sandwiched between the positive and negative material grids of this invention, as used in a spiral-wound cell.

Still further, while the present invention has been described and illustrated in conjunction with a non-conductive active material grid, it should be appreciated that a conductive grid could also be used, if desired. While increasing the weight of the component and thus undesirable in some applications, a conductive grid can be used, if desired. Thus, lead or lead-alloy grid meshes may be employed, as can be plastic conductive meshes or polymer-conductive meshes. Such conductive meshes may provide better and more uniform conductivity in the paste, perhaps leading to more uniform active material usage and a longer active service life.

I claim:

1. A method of making a bipolar lead-acid cell which comprises providing at least one conductive substrate, providing a separate mesh for at least one positive active material grid and one negative active material grid, pasting each mesh with a positive or negative active material paste to make at least one positive and one negative active material grid, curing at least one of the positive and negative active material grids prior to being placed on one side of said conductive substrate, placing the positive active material grid on one side of said conductive substrate and the negative active material grid on the other side, and assembling the bipolar cell such that the assembled cell maintains the positive and negative active material grids in contact with said conductive substrate.

2. The method of making the bipolar lead-acid cell of claim 1 wherein each of said separate meshes is a plastic mesh.

3. The method of claim 2 wherein each of said separate meshes has a void volume of at least 50%.

4. The method of claim 3 wherein each of said plastic meshes has a void volume of at least about 80%.

5. The method of claim 2 wherein said plastic mesh has a thickness of from about 5 mils to about 250 mils and the mesh has openings which have an area of from about 1 mm$^2$ to about 1 cm$^2$.

6. The method of claim 2 wherein a plastic frame is provided for each conductive substrate and said conductive substrate is embedded within said plastic frame about the periphery of said conductive substrate.

7. The method of claim 1 which includes providing a glass fiber separator having an uncompressed thickness and compressing said separator in the assembled cell so as to maintain the positive and negative active materials in contact with said conductive substrate.

8. The method of claim 7 wherein said separator is compressed to at least about 50% to about 90% of its uncompressed thickness.

* * * * *

UNITED STATES PATENT AND TRADEMARK OFFICE
CERTIFICATE OF CORRECTION

PATENT NO. : 5,993,494
DATED : November 30, 1999
INVENTOR(S) : Malikayil

It is certified that error appears in the above-identified patent and that said Letters Patent is hereby corrected as shown below:

Column 2, Line 19: "resting" should read "nesting".

Signed and Sealed this

Fifth Day of September, 2000

Attest:

Q. TODD DICKINSON

*Attesting Officer*  *Director of Patents and Trademarks*